United States Patent
Morley

[15] 3,637,325
[45] Jan. 25, 1972

[54] BLADE STRUCTURE

[72] Inventor: John Godfrey Morley, Little Eaton, England

[73] Assignee: Secretary of State for Defense, London, England

[22] Filed: Dec. 2, 1969

[21] Appl. No.: 881,551

[52] U.S. Cl. .......................... 416/230, 416/224, 416/241
[51] Int. Cl. ................................................ F01d 5/14
[58] Field of Search .................. 416/225, 229, 230, 241, 224

[56] References Cited

UNITED STATES PATENTS

| | | |
|---|---|---|
| 3,132,841 | 5/1964 | Wilder ..................................... 416/230 X |
| 3,294,366 | 12/1966 | Coplin ..................................... 416/230 X |
| 3,310,116 | 3/1967 | Saeki et al. ............................. 416/229 |
| 3,519,228 | 7/1970 | Windecker ............................... 416/229 X |

FOREIGN PATENTS OR APPLICATIONS

| | | |
|---|---|---|
| 789,671 | 8/1935 | France ..................................... 416/229 |
| 869,655 | 6/1961 | Great Britain ........................... 416/230 |

*Primary Examiner*—Everette A. Powell, Jr.
*Attorney*—Cushman, Darby & Cushman

[57] ABSTRACT

A composite blade for use in gas turbine engines has a core formed by spanwise fiber reinforced members separated by metallic strips, the core being at least partially covered by a metallic sheet.

3 Claims, 2 Drawing Figures

PATENTED JAN 25 1972

3,637,325

Inventor
John Godfrey Morley
By
Cushman, Darby & Cushman
Attorneys

BLADE STRUCTURE

This invention relates to a blade, for example, a compressor or turbine blade for use in a gas turbine engine.

According to the present invention there is provided a blade for a fluid flow machine having a core formed of a plurality of spanwise extending fiber-reinforced members separated from each other by metallic dividing members, the core being covered at least in part by a metallic sheet.

The leading and trailing edges of the blade may be formed integrally with the metallic sheet. The portion of the core not covered by the sheet may be covered with layers of cross braced fiber-reinforced material which may be metal coated. The fiber-reinforced members may be formed with root fixing portions and the fiber used in the fiber-reinforced members and layers is preferably carbon fiber.

The present invention will now be more particularly described merely by way of example with reference to the accompanying drawing in which.

Figure 1:
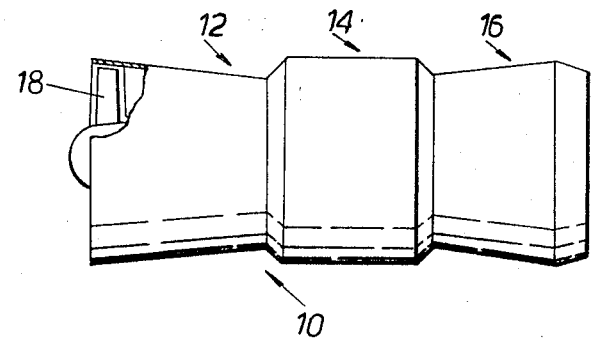
FIG. 1 shows a diagrammatic elevation of a gas turbine engine.
Figure 2:
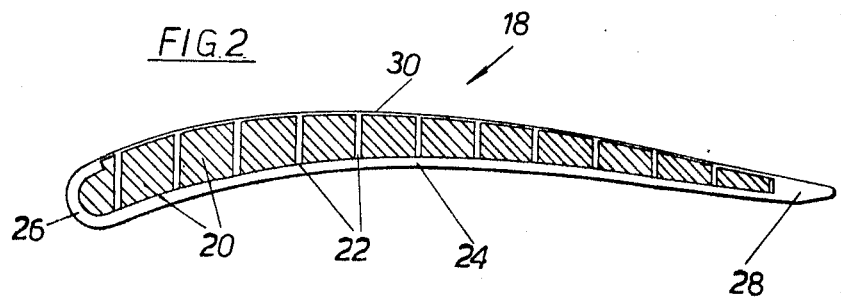
FIG. 2 is a section on line 2—2 of FIG. 1 showing one form of blade according to the present invention.

In FIG. 1, a gas turbine engine 10 has compressor means 12, combustion equipment 14 and turbine means 16. The compressor has a plurality of rotor blades 18 a portion of one of which is shown in FIG. 2.

The blade consists of a core formed of a number of spanwise extending fiber-reinforced members 20, which are attached by an adhesive material to thin metal strips 22 extending from the root to the tip of the blade. The strips 22 are arranged parallel to each other and assist in stabilizing the members 20 under a compressive load and reduce the tendency of the members 20 to buckle and crumble particularly under impact loading such as to place the metal sheet 24 in tension. The members 20 provide a large surface area for adhesion and each have moulded root fixing portions. The concave surface of the blade is covered with a metal sheet 24 which is formed with integral leading and trailing edge portions 26 and 28 respectively.

The convex surface is covered with cross braced layers 30 of fiber-reinforced material which is metal plated; alternatively the convex surface may only be metal plated. The fiber-reinforced members 20 and layers 30 are preferably made from carbon fiber resin composite material for example "Hyfil" (Registered Trademark).

The blade is constructed to withstand impact loads and under such loads, the sheet 24 is placed in tension and the members 20 in compression and since each member has a separate root fixing, the members behave independently of each other.

I claim:

1. A blade for a compressor or turbine of a gas turbine engine comprising: a composite core, said core including a plurality of individual spanwise extending carbon fiber-reinforced structural members, each of said fiber-reinforced structural members having an integral root fixing portion, the root fixing portion of one of said fiber-reinforced structural members being independent of the root fixing portion of the other said fiber-reinforced structural members whereby said fiber-reinforced structural members may act independently of each other, a plurality of spanwise extending flat metallic strips, adjacent fiber-reinforced structural members being separated by and attached to one of said flat metallic strips and said strips being spaced along and extending transverse of the chord of said blade whereby said strips may absorb at least some of the compressive energy caused by impact loading; a metallic sheet covering a part of said core; and layers of cross-braced carbon fiber-reinforced material covering a remaining part of said core, said cross-braced layers being metal coated.

2. A blade as claimed in claim 1 in which said blade has leading and trailing edges, said leading and trailing edges being metal and integral with said metallic sheet.

3. A blade as claimed in claim 2 in which said blade has a convex surface and a concave surface and in which said metallic sheet covers said concave surface.

* * * * *